US011536293B2

(12) United States Patent
Wang (10) Patent No.: US 11,536,293 B2
(45) Date of Patent: Dec. 27, 2022

(54) QUICK CEILING FAN MOUNTING BRACKET WITH SAFETY PROTECTION STRUCTURE

(71) Applicant: AIR COOL INDUSTRIAL CO., LTD., Taichung (TW)

(72) Inventor: Cliff Wang, Taichung (TW)

(73) Assignee: AIR COOL INDUSTRIAL CO., LTD., Taichung (TW)

( * ) Notice: Subject to any disclaimer, the term of this patent is extended or adjusted under 35 U.S.C. 154(b) by 173 days.

(21) Appl. No.: 17/164,798

(22) Filed: Feb. 1, 2021

(65) Prior Publication Data
US 2022/0243741 A1 Aug. 4, 2022

(51) Int. Cl.
*F04D 29/64* (2006.01)
*F16M 13/02* (2006.01)

(52) U.S. Cl.
CPC ......... *F04D 29/646* (2013.01); *F16M 13/027* (2013.01)

(58) Field of Classification Search
CPC .... F04D 29/646; F04D 25/088; F04D 29/601; F16M 13/027; F24F 7/00
USPC ................................ 248/342, 343, 344, 906
See application file for complete search history.

(56) References Cited

U.S. PATENT DOCUMENTS

| 4,988,067 A * | 1/1991 | Propp ..................... H02G 3/20 411/389 |
| 7,300,248 B2 * | 11/2007 | Wang .................... F04D 25/088 248/343 |
| 8,025,528 B2 * | 9/2011 | Smith .................. F16M 11/041 439/537 |

FOREIGN PATENT DOCUMENTS

AU 2005311620 A1 * 6/2006 ............ F21V 21/002

* cited by examiner

*Primary Examiner* — Kimberly T Wood
(74) *Attorney, Agent, or Firm* — Pai Patent & Trademark Law Firm; Chao-Chang David Pai (57) ABSTRACT

A quick ceiling fan mounting bracket with a safety protection structure has a bracket, two guide rails and an elastic engaging member. The bracket is configured to connect a junction box and a ceiling fan motor unit. The junction box is locked with two locking members. When installed, the locking members are half locked into locking holes of the junction box, and the heads of the locking members are positioned at positioning holes and a force is applied to the elastic engaging member for the locking members to pass through the guide rails. When the head of the locking member is displaced, an engaging portion of the elastic engaging member is against the head of the locking member to achieve the effect of safety protection.

10 Claims, 11 Drawing Sheets

QUICK CEILING FAN MOUNTING BRACKET WITH SAFETY PROTECTION STRUCTURE

FIELD OF THE INVENTION

The present invention relates to a ceiling fan mounting bracket, and more particularly to a quick ceiling fan mounting bracket with a safety protection structure.

BACKGROUND OF THE INVENTION

Figure 1:
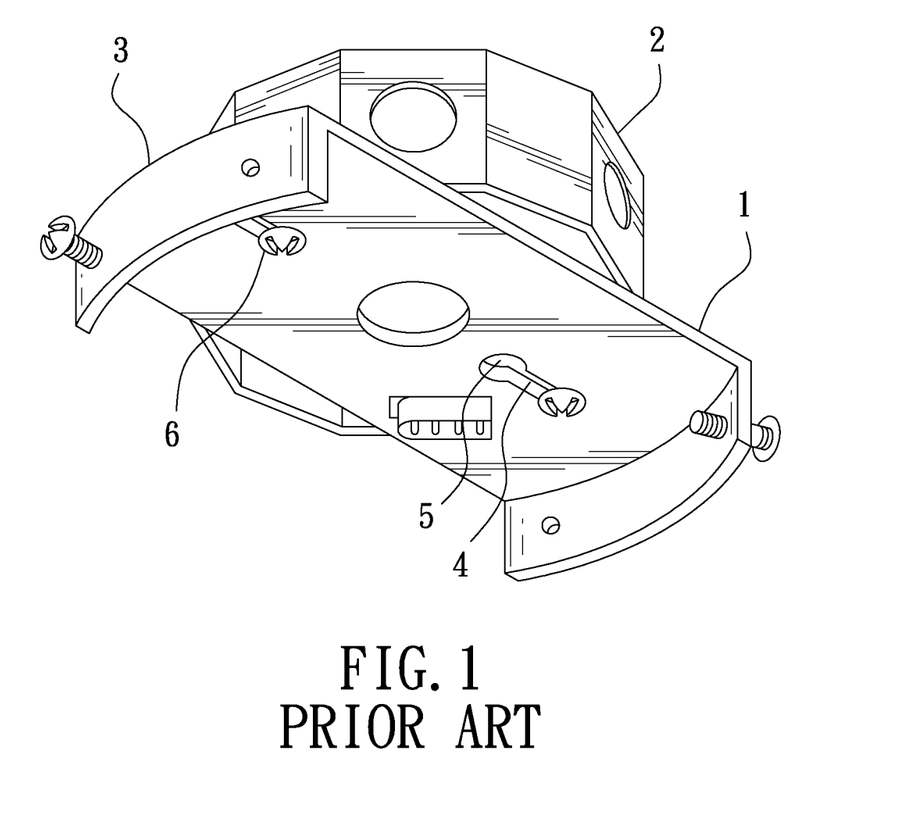
FIG. 1 is a perspective view of a conventional ceiling fan mounting bracket.

As shown in FIG. 1, a conventional ceiling fan mounting bracket 1 is connected to a junction box 2. The junction box 2 is installed to the ceiling. The ceiling fan mounting bracket 1 has a bracket body 3. The bracket body 3 is provided with two slots 4. One end of each slot 4 is formed with a position hole 5. In the ceiling fan mounting bracket 1, two screws 6 are respectively inserted through the corresponding position holes 5, and the screws 6 are moved to the corresponding slots 4. By positioning the screws 6 in the slots 4, the ceiling fan mounting bracket 1 is fixed to the junction box 2. Finally, a ceiling fan motor unit is installed for the ceiling fan to operate normally.

However, the screw 6 of the ceiling fan mounting bracket 1 is not blocked by a stopper. If the ceiling fan runs for a long time and vibrates, it is easy to cause the screw 6 to loosen or have a displacement. As a result, the screw 6 may move from the slot 4 to the position hole 5 or fall off from the position hole 5, causing the ceiling fan to fall. Accordingly, the inventor of the present invention has devoted himself based on his many years of practical experiences to solve these problems.

SUMMARY OF THE INVENTION

The primary object of the present invention is to provide a quick ceiling fan mounting bracket with a safety protection structure, which has the advantages of quick installation and increased ceiling fan stability, thereby reducing the risk of the ceiling fan loosening or displacement to achieve the effect of safety protection.

In order to achieve the above object, the present invention provides a quick ceiling fan mounting bracket with a safety protection structure, comprising a bracket. A junction box is provided on a top of the bracket. The junction box has two locking holes. A locking member is locked to each of the locking holes of the junction box in a bottom-up direction. The locking member has a head and a locking member body. The head of the locking member has a radius greater than that of the locking member body. A ceiling fan motor unit is fixedly connected to an underside of the bracket. The bracket is provided with two guide rails. The guide rails each have a positioning hole in the bracket. The positioning holes of the guide rails correspond in position to the locking holes of the junction boxes, respectively. The positioning hole has a diameter greater than that of the head of the locking member. The positioning hole extends toward a guide direction to form a guide hole for guiding a displacement of the locking member body. The guide hole has a width greater than a diameter of the locking member body. The width of the guide hole is less than the diameter of the head of the locking member. The guide hole defines an outer guide hole section adjacent to the positioning hole and an inner guide hole section far away from the positioning hole. Spaces including two sides of the positioning hole, the positioning hole, the outer guide hole section and two sides of the outer guide hole section of each guide rail are connected to form a guide path for guiding a displacement of the locking member. One of the guide rails is defined as a first guide rail. The positioning hole, the outer guide hole section and the guide path of the first guide rail are defined as a first positioning hole, a first outer guide hole section and a first guide path. An elastic engaging member corresponds to the first guide rail and is fixedly connected to the bracket. The elastic engaging member includes an elastic portion and an engaging portion. The elastic portion has a fixed end fixed to the bracket and a free end connected to the engaging portion. When the free end of the elastic portion is in a normal state, it is in a normal position on the first guide path and adjacent to the first positioning hole. When an external force is applied to the free end of the elastic portion, the free end is elastically moved along an elastic displacement direction to a stressed position away from the first guide path. The elastic displacement direction of the elastic portion and the guide direction of the guide hole are not parallel. When the free end of the elastic portion is in the normal position, the engaging portion is located on the first guide path. When the free end of the elastic portion is in the stressed position, the engaging portion is away from the first guide path.

When the quick ceiling fan mounting bracket provided by the present invention is to be installed, the locking members are half locked into the locking holes of the junction box. The heads of the locking members are spaced a distance from the locking holes, which allows the bracket to be displaced and enables the heads of the locking members to be positioned in the positioning holes. The locking member corresponding to the first positioning hole is defined as a first locking member. The head of the first locking member applies a force to the elastic portion of the elastic engaging member, so that the elastic portion of the elastic member is displaced from the normal position to the stressed position to be away from the first positioning hole and the first guide path for the locking member bodes and the heads of the locking members to pass through the guide holes and the guide paths respectively to further displace the heads of the locking members to be under the inner guide hole sections. The bracket is locked to the locking holes of the junction box. The engaging portion of the elastic engaging member is located in the first guide path in the normal state. When the head of the first locking member is displaced, the engaging portion of the elastic engaging member is against the head of the first locking member to provide a safety protection.

DETAILED DESCRIPTION OF THE PREFERRED EMBODIMENTS

Embodiments of the present invention will now be described, by way of example only, with reference to the accompanying drawings.

Figure 2:
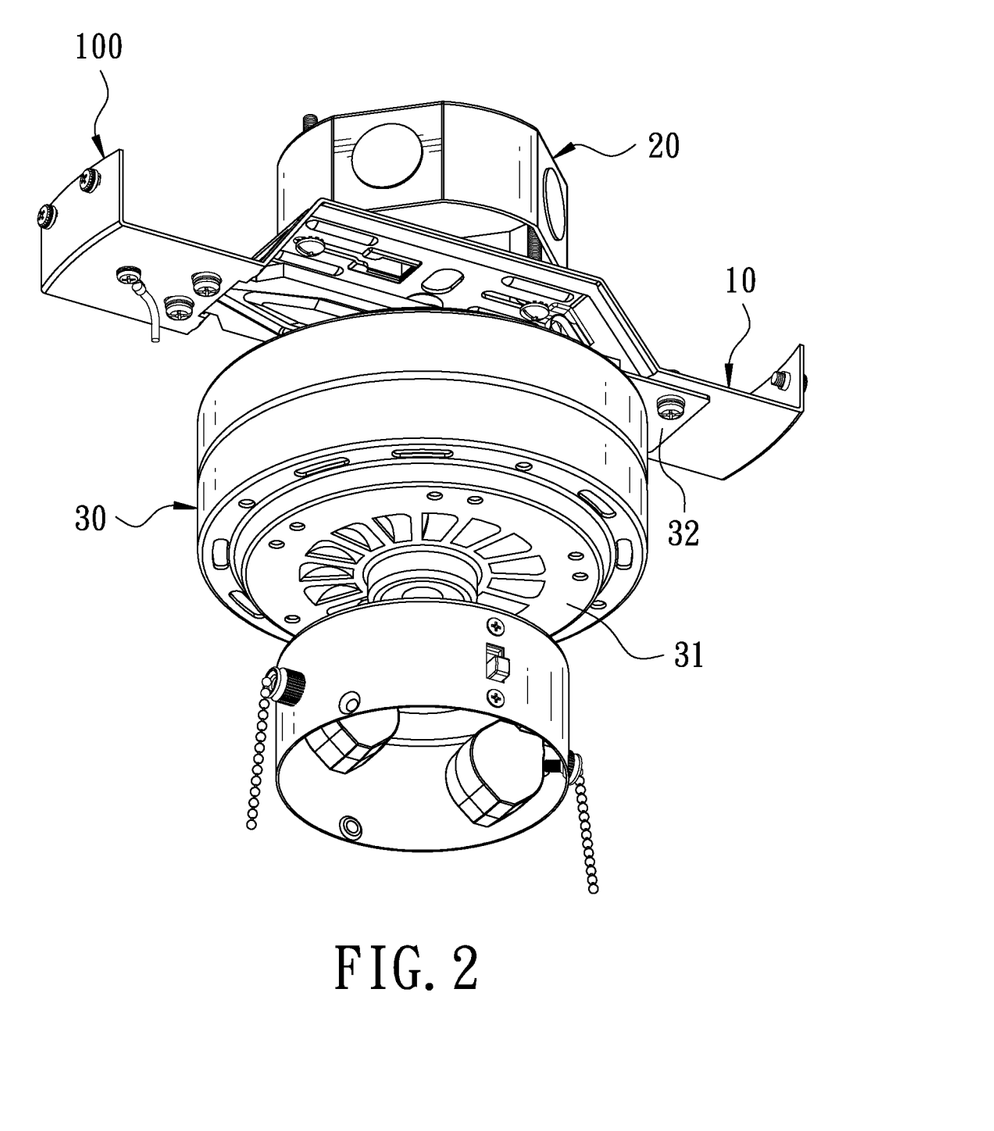
FIG. 2 is a perspective view in accordance with a preferred embodiment of the present invention.
Figure 3:
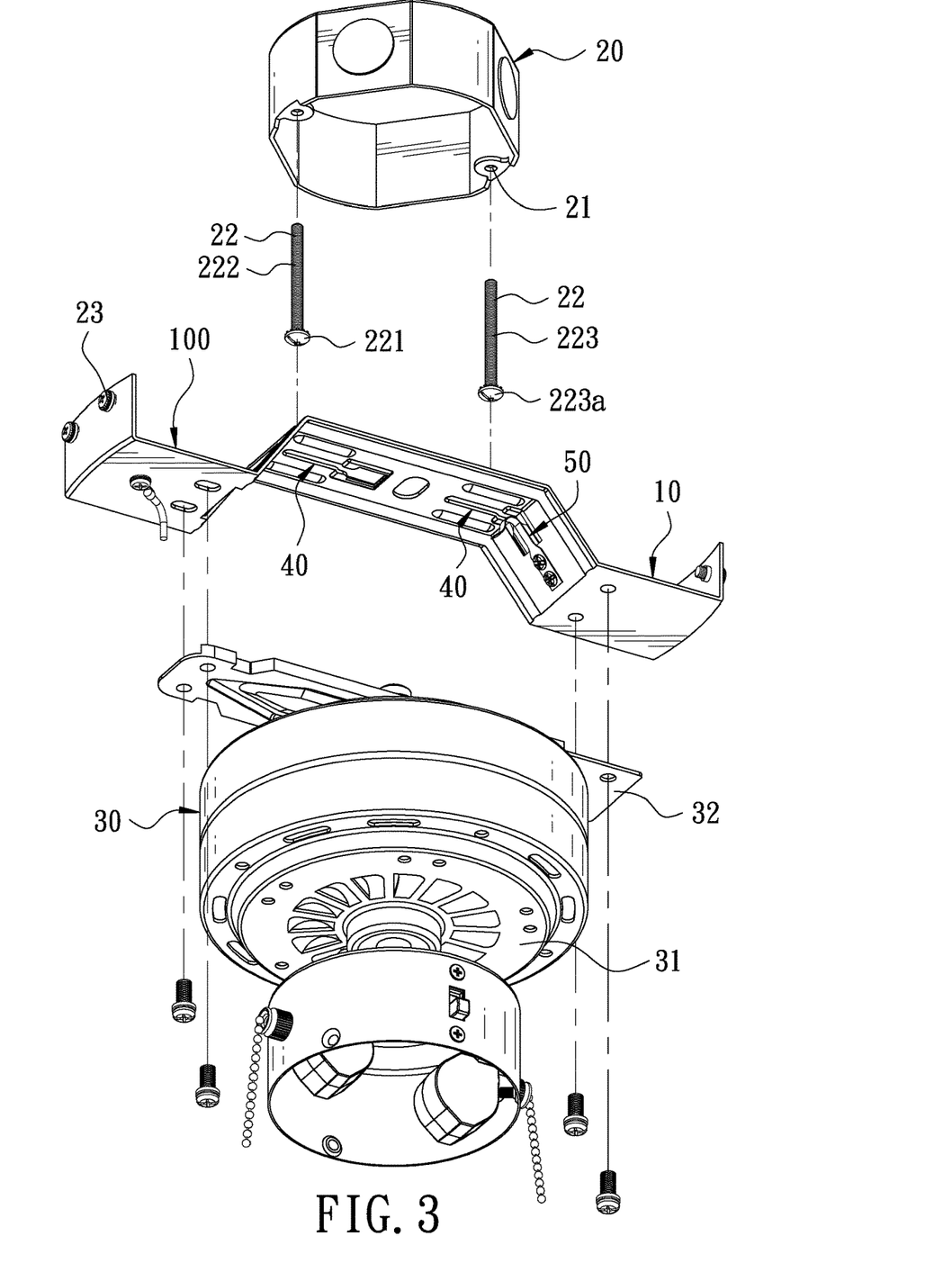
FIG. 3 is an exploded view in accordance with the preferred embodiment of the present invention.
Figure 4:
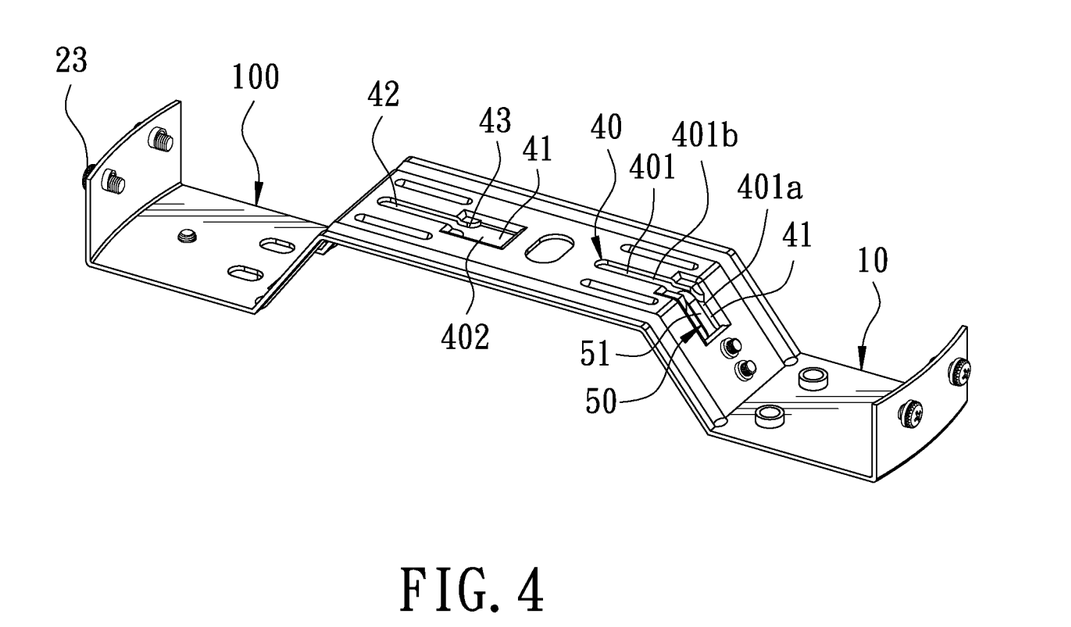
FIG. 4 is a perspective view of the mounting bracket in accordance with the preferred embodiment of the present invention.
Figure 5:
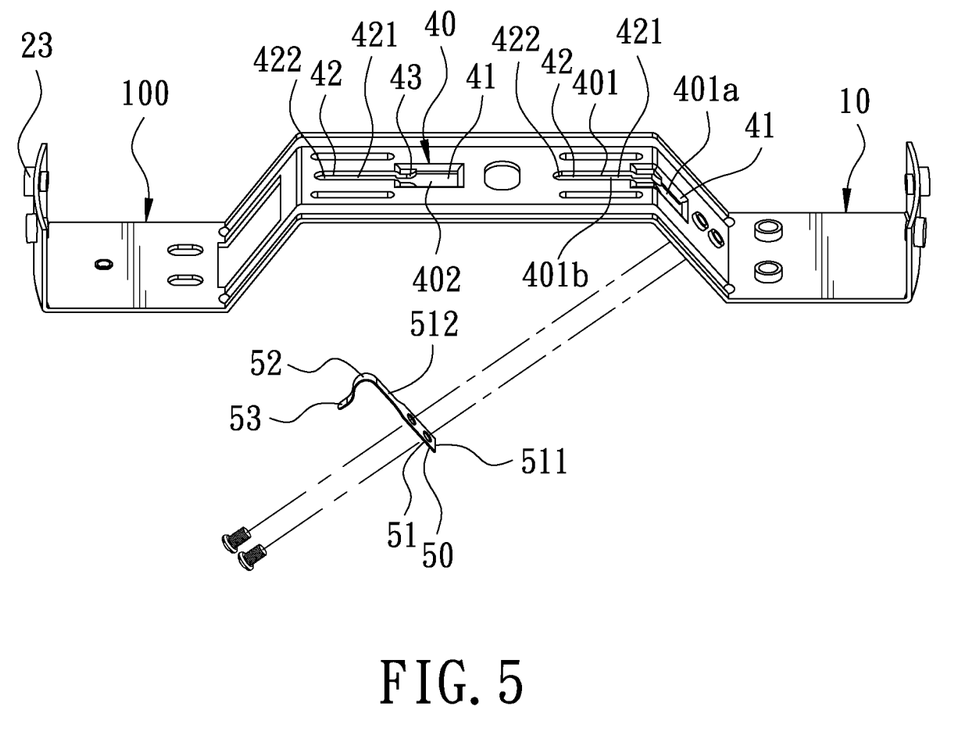
FIG. 5 is an exploded view of the mounting bracket in accordance with the preferred embodiment of the present invention.
Figure 6:
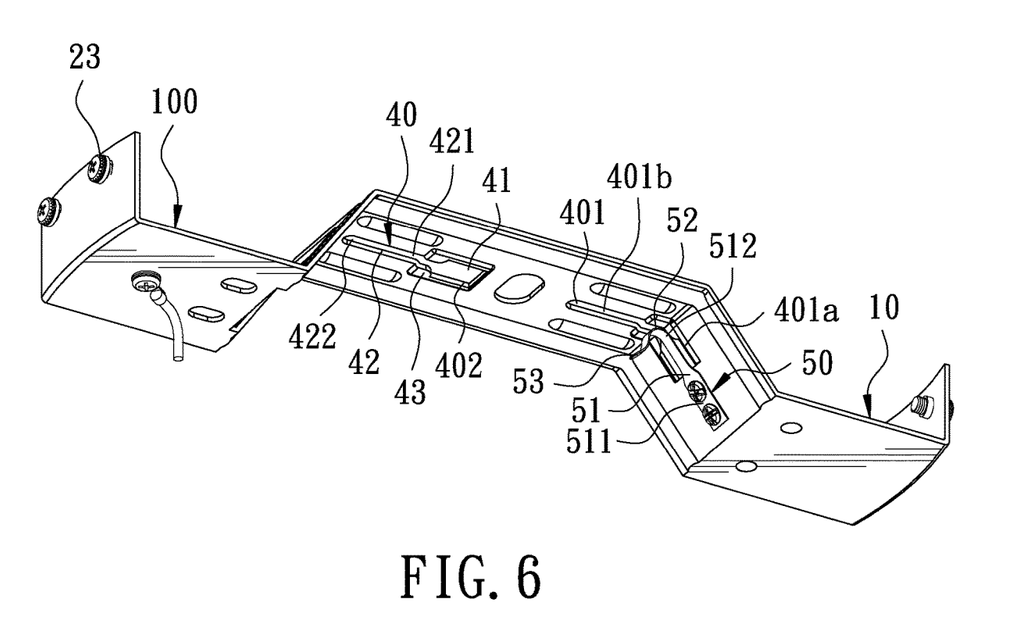
FIG. 6 is another perspective view of the mounting bracket in accordance with the preferred embodiment of the present invention.

As shown in FIGS. 2-7, the present invention discloses a quick ceiling fan mounting bracket 100 with a safety protection structure, comprising a bracket 10. Referring to FIGS. 2-3, a junction box 20 is provided on the top of the bracket 10. The junction box 20 has two locking holes 21. A locking member 22 is locked to each of the locking holes 21 of the junction box 20 in a bottom-up direction. The locking member 22 is a screw. The locking member 22 has a head 221 and a locking member body 222. The radius of the head 221 of the locking member 22 is greater than the radius of the locking member body 222. Two sides of the bracket 10 are provided with a plurality of fasteners 23 for fastening a casing. A ceiling fan motor unit 30 is fixedly connected to the underside of the bracket 10. The ceiling fan motor unit 30 is composed of a motor 31 and a connecting support 32.

Please refer to FIGS. 4-7. The bracket 10 is provided with two guide rails 40. The guide rails 40 each has a positioning hole 41 in the bracket 10. The positioning holes 41 of the guide rails 40 correspond in position to the locking holes 21 of the junction boxes 20, respectively. The diameter of the positioning hole 41 is greater than the diameter of the head 221 of the locking member 22. The positioning hole 41 extends toward a guide direction 42a to form a guide hole 42. The positioning hole 41 is provided with a guide portion 43 at a position adjacent to the guide hole 42. The guide portion 43 is tapered inward toward the guide hole 42 to guide the displacement of the locking member body 222 of the locking member 22. The width of the guide hole 42 is greater than the diameter of the locking member body 222. The width of the guide hole 42 is less than the diameter of the head 221 of the locking member 22. Each guide hole 42 defines an outer guide hole section 421 adjacent to the positioning hole 41 and an inner guide hole section 422 far away from the positioning hole 41, so that the spaces, including two sides of the positioning hole 41 of each guide rail 40, the positioning hole 41, the outer guide hole section 421 and two sides of the outer guide hole section 421, are connected to form a guide path 44 for guiding the displacement of the locking member 22. One of the guide rails 40 is defined as a first guide rail 401. The positioning hole 41, the outer guide hole section 421 and the guide path 44 of the first guide rail 401 are defined as a first positioning hole 401a, a first outer guide hole section 401b, and a first guide path 401c. The other guide rail 40 is defined as a second guide rail 402. The first guide hole 401b of the first guide rail 401 and the second guide rail 402 are arranged on the same plane. The first positioning hole 401a of the first guide rail 401 is arranged downward and obliquely from the first guide hole 401b toward the first positioning hole 401a, so that a reserve space is formed above the first positioning hole 401a.

Figure 7:
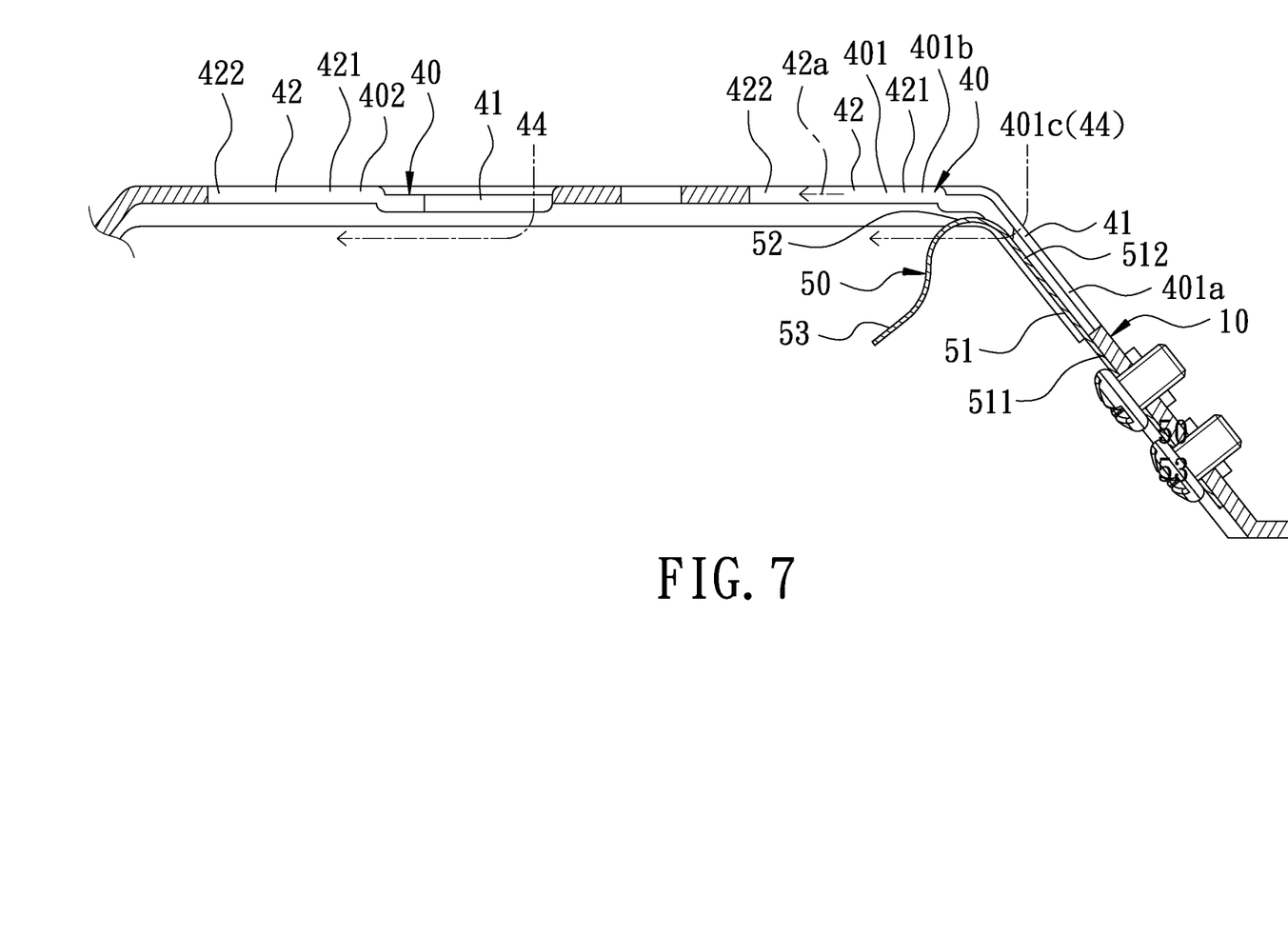
FIG. 7 is a partial cross-sectional view in accordance with the preferred embodiment of the present invention.
Figure 8:
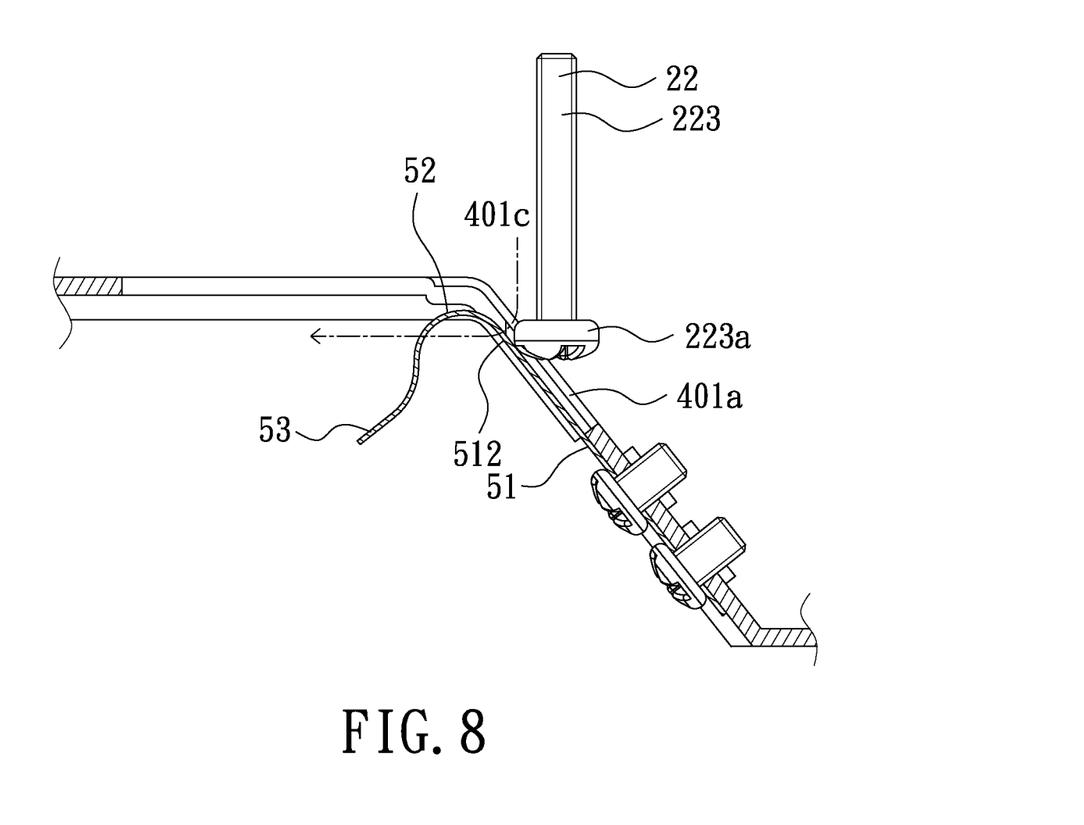
FIG. 8 is a partial enlarged view of the preferred embodiment of the present invention, showing the state that the elastic engaging member is fixed to the bracket.
Figure 9:
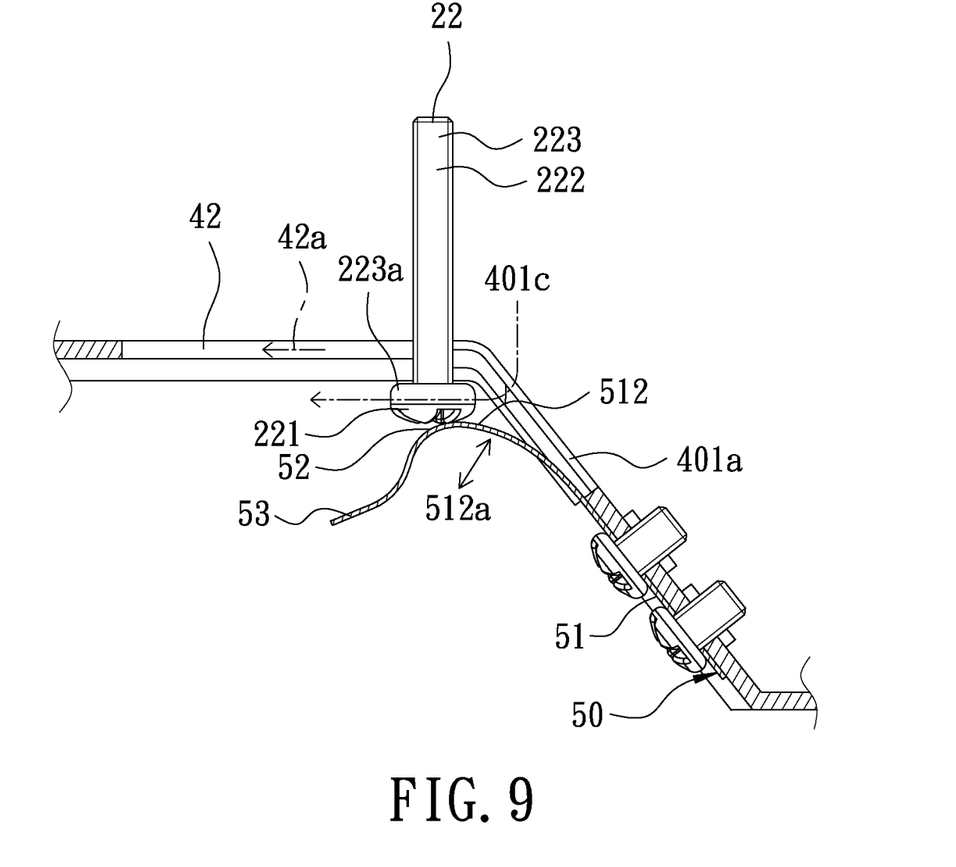
FIG. 9 is a schematic view of the operation of the preferred embodiment of the present invention, showing the state of the locking member pressing the elastic engaging member downward.

Referring to FIGS. 7-9, an elastic engaging member 50, corresponding to the first guide rail 401, is fixedly connected to the bracket 10. The elastic engaging member 50 includes an elastic portion 51, an engaging portion 52, and an operating portion 53. The elastic portion 51, the engaging portion 52 and the operating portion 53 are integrally formed. The elastic portion 51 has a fixed end 511 fixed to the bracket 10 and a free end 512 connected to the engaging portion 52. The engaging portion 52 of the elastic engaging member 50 is further connected to the operating portion 53. When the free end 512 of the elastic portion 51 is in a normal state, it is in a normal position on the first guide path 401c and adjacent to the first positioning hole 401a. When an external force is applied to the free end 512 of the elastic portion 51, the free end 512 is elastically moved along an elastic displacement direction 512a to a stressed position away from the first positioning hole 401a and the first guide path 401c. The free end 512 of the elastic portion 51 is elastically arranged between the normal position and the stressed position. The elastic displacement direction 512a of the elastic portion 51 and the guide direction 42a of the guide hole 42 are not parallel. When the free end 512 of the elastic portion 51 is in the normal position, the engaging portion 52 is located on the first guide path 401c. When the free end 512 of the elastic portion 51 is in the stressed position, the engaging portion 52 is away from the first guide path 401c. When the operating portion 53 is in a normal state, the operating portion 53 is linked with the free end 512 and the elastic portion 52 and the engaging portion 51. When the operating portion 53 is in a stressed state, the operating portion 53 controls the free end 512 of the elastic portion 51 and the engaging portion 52 to be away from the first positioning hole 401a and the first guide path 401c.

FIG. 8 is a schematic view of the operation of the preferred embodiment of the present invention, showing the state of the locking member pressing the elastic engaging member downward. When installed, the locking members 22 can be half locked into the locking holes 21 of the junction box 20. The heads 221 of the locking members 22 are spaced a distance from the locking holes 21, which allows the bracket 10 to be displaced and enables the heads 221 of the locking members 22 to be positioned in the positioning holes 41. The locking member 22 corresponding to the first positioning hole 401a is defined as a first locking member 223. The reserve space makes the positioning of the first locking member 223 more stable.

Figure 10:
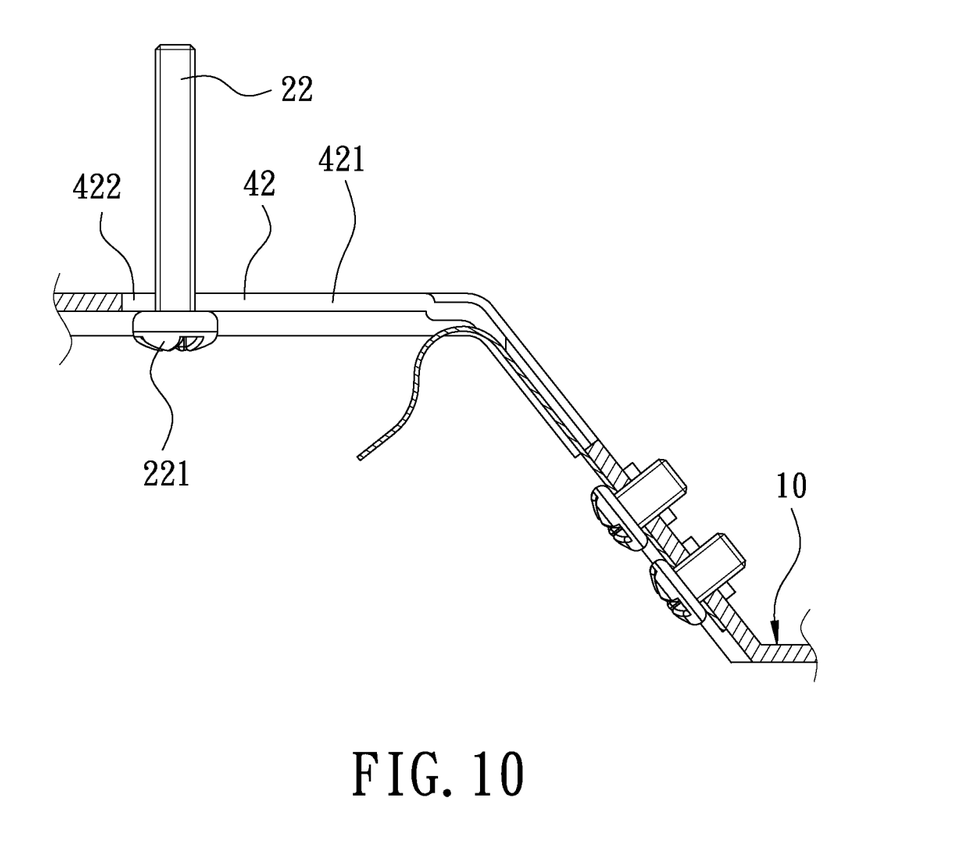
FIG. 10 is a schematic view of the operation of the preferred embodiment of the present invention, showing the state of the locking member passing through the guide rail.

Referring to FIGS. 8-10, the head 223a of the first locking member 223 applies a force to the elastic portion 51 of the elastic engaging member 50, so that the elastic portion 51 of the elastic member 50 is displaced from the normal position to the stressed position, as shown in FIG. 9, to be away from the first positioning hole 401a and the first guide path 401c for the locking member bodes 222 and the heads 221 of the locking members 22 to pass through the guide holes 42 and the guide paths 44 respectively to further displace the heads 221 of the locking members 22 to be under the inner guide hole sections 422. As shown in FIG. 10, the bracket 10 and the locking holes 21 of the junction box 20 are locked by the locking members 22 (not shown in the figure).

Figure 11:
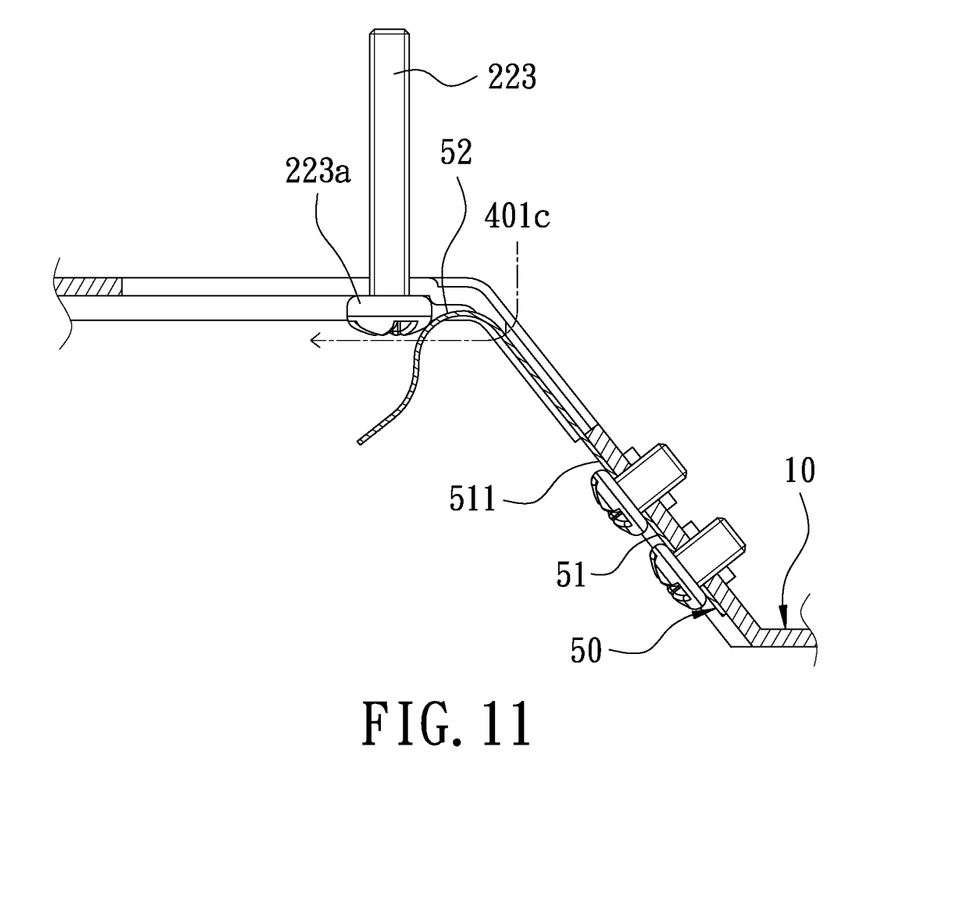
FIG. 11 is a schematic view of the operation of the preferred embodiment of the present invention, showing the state that the elastic engaging member is against the locking member.

FIG. 11 is a schematic view of the operation of the preferred embodiment of the present invention, showing the state that the locking member is against the elastic engaging member. The engaging portion 52 of the elastic engaging member 50 is located in the first guide path 401c in the normal state. When the head 223a of the first locking member 223 is displaced, the engaging portion 52 of the elastic engaging member 50 is against the head 223a of the first locking member 223 to achieve the effect of safety protection. The elastic engaging member 50 is integrally formed. The elastic portion 51 is a plate spring, which is a metal sheet with elasticity and supporting force. The elastic engaging member 50 is locked to the underside of the bracket. The fixed end 511 of the elastic portion 51 is supported by the bracket 10, which further enhances the supporting strength of the engaging portion 52 of the elastic engaging member 50 against the first locking member 223.

It is worth mentioning that there is a distance between the upper end and the lower end of the bracket 10. The bracket 10 has a stepped shape as a whole, so that an accommodating space is formed between the upper end and the lower end of the bracket 10 for accommodating a part of the ceiling fan motor unit 30.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A quick ceiling fan mounting bracket with a safety protection structure, comprising a bracket, a junction box being provided on a top of the bracket, the junction box having two locking holes, a locking member being locked to each of the locking holes of the junction box in a bottom-up direction, the locking member having a head and a locking member body, the head of the locking member having a radius greater than that of the locking member body, a ceiling fan motor unit being fixedly connected to an underside of the bracket;

two guide rails, the guide rails each having a positioning hole in the bracket, the positioning holes of the guide rails corresponding in position to the locking holes of the junction boxes respectively, the positioning hole having a diameter greater than that of the head of the locking member, the positioning hole extending toward a guide direction to form a guide hole for guiding a displacement of the locking member body, the guide hole having a width greater than a diameter of the locking member body, the width of the guide hole being less than the diameter of the head of the locking member, the guide hole defining an outer guide hole section adjacent to the positioning hole and an inner guide hole section far away from the positioning hole, spaces including two sides of the positioning hole, the positioning hole, the outer guide hole section and two sides of the outer guide hole section of each guide rail being connected to form a guide path for guiding a displacement of the locking member, one of the guide rails being defined as a first guide rail, the positioning hole, the outer guide hole section and the guide path of the first guide rail being defined as a first positioning hole, a first outer guide hole section and a first guide path;

an elastic engaging member, corresponding to the first guide rail and fixedly connected to the bracket, the elastic engaging member including an elastic portion and an engaging portion, the elastic portion having a fixed end fixed to the bracket and a free end connected to the engaging portion, wherein when the free end of the elastic portion is in a normal state, it is in a normal position on the first guide path and adjacent to the first positioning hole, when an external force is applied to the free end of the elastic portion, the free end is elastically moved along an elastic displacement direction to a stressed position away from the first guide path, when the free end of the elastic portion is in the normal position, the engaging portion is located on the first guide path, when the free end of the elastic portion is in the stressed position, the engaging portion is away from the first guide path;

wherein, when installed, the locking members are half locked into the locking holes of the junction box, the heads of the locking members are spaced a distance from the locking holes, which allows the bracket to be displaced and enables the heads of the locking members to be positioned in the positioning holes, the locking member corresponding to the first positioning hole is defined as a first locking member, the head of the first locking member applies a force to the elastic portion of the elastic engaging member, so that the elastic portion of the elastic member is displaced from the normal position to the stressed position to be away from the first positioning hole and the first guide path for the locking member bodies and the heads of the locking members to pass through the guide holes and the guide paths respectively to further displace the heads of the locking members to be under the inner guide hole sections, the bracket and the locking holes of the junction box are locked by the locking members, the engaging portion of the elastic engaging member is located in the first guide path in the normal state, when the first locking member is displaced, the engaging portion of the elastic engaging member is against the first locking member to provide a safety protection.

2. The quick ceiling fan mounting bracket as claimed in claim 1, wherein the elastic displacement direction of the elastic portion and the guide direction of the guide hole are not parallel.

3. The quick ceiling fan mounting bracket as claimed in claim 2, wherein the elastic engaging member further includes an operating portion connected to the engaging portion, when the operating portion is in a stressed state, the operating portion controls the free end of the elastic portion and the engaging portion to be away from the first positioning hole and the first guide path.

4. The quick ceiling fan mounting bracket as claimed in claim 3, wherein the elastic portion, the engaging portion and the operating portion are integrally formed.

5. The quick ceiling fan mounting bracket as claimed in claim 4, wherein the elastic portion is a plate spring, the elastic engaging member is locked to the underside of the bracket, and the fixed end of the elastic portion is supported by the bracket.

6. The quick ceiling fan mounting bracket as claimed in claim 1, wherein the other guide rail is defined as a second guide rail, the first guide hole of the first guide rail and the second guide rail are arranged on a same plane, the first positioning hole of the first guide rail is arranged downward and obliquely from the first guide hole toward the first positioning hole, so that a reserve space is formed above the first positioning hole.

7. The quick ceiling fan mounting bracket as claimed in claim 1, wherein a distance is defined between an upper end and a lower end of the bracket, the bracket has a stepped shape, so that an accommodating space is formed between the upper end and the lower end of the bracket.

8. The quick ceiling fan mounting bracket as claimed in claim 1, wherein two sides of the bracket are provided with a plurality of fasteners for fastening a casing.

9. The quick ceiling fan mounting bracket as claimed in claim 1, wherein the locking member is a screw.

10. The quick ceiling fan mounting bracket as claimed in claim 1, wherein the positioning hole is provided with a guide portion at a position adjacent to the guide hole, and the guide portion is tapered inward toward the guide hole.

* * * * *